Patented Dec. 1, 1931

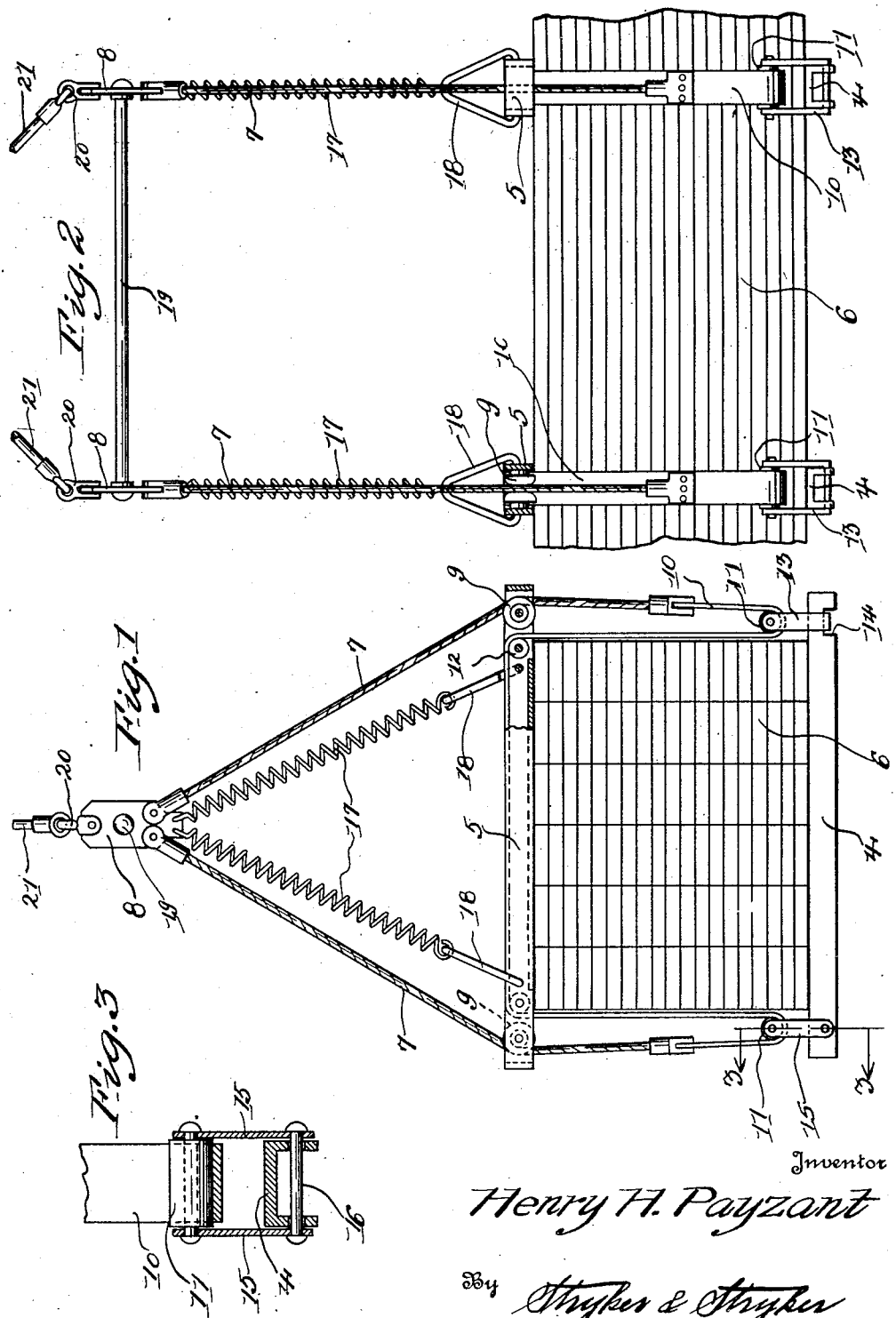

1,834,902

UNITED STATES PATENT OFFICE

HENRY H. PAYZANT, OF EVERETT, WASHINGTON, ASSIGNOR TO WEYERHAEUSER TIMBER COMPANY, OF TACOMA, WASHINGTON, A CORPORATION OF WASHINGTON

SLING

Application filed December 24, 1929. Serial No. 416,248.

This invention relates to slings, particularly, although not exclusively, adapted for use in handling lumber or where a somewhat irregular body or pile of loose objects are to be lifted by power-actuated means. One important field of use for my device is the loading and unloading of lumber to and from ships, trucks, cars, or the like. Heretofore in the loading and unloading of large quantities of lumber, damage to the lumber and breaking loose of the loads with consequent damage to other property has resulted from failure of the slings to properly grip and retain the loads. As the loads are sometimes of several tons weight they cause great damage when accidentally dropped, as by failure of the sling, and the existing slings frequently split the boards or break the edges thereof because of irregular gripping edgeways of the boards.

It is my object to provide a sling adapted to securely hold heavy bundles or bodies of more or less irregularly shaped goods and without damage thereto. A further object is to provide a sling of this type adapted to be loaded and unloaded with a minimum work. The invention also includes certain other novel features of construction which will be more fully pointed out in the following specification and claims.

In the drawings, Figure 1 is a side elevation, partially in section, of my improved sling illustrating the method of carrying a bundle of lumber, said bundle being shown diagrammatically in end view, Fig. 2 is an end view of a pair of slings connected together in spaced relation, as in carrying a long bundle of lumber, the latter being shown in side view and Fig. 3 is a section taken on the line 3—3 of Fig. 1.

My device is adapted to grip a bundle of lumber between a bottom bar 4 and a top bar 5, preferably constructed of steel and of channel shape in cross section. Suitable flat sides of these bars 4 and 5 engage the lumber 6, or other material or goods to be carried. Cables 7 are severally connected at their upper ends to a hanger plate 8 and pass over the periphery of guide pulleys 9 mounted near opposite ends of the bar 5. The lower ends of the cables 7 are severally connected to opposite ends of a strap 10 which extends in continuation of the cables around pulleys 11 secured to the bar 4 and from these pulleys upward over and between rollers 12 journaled on the bar 5. The pulleys 9 and rollers 12 are mounted between upwardly extending flanges on the bar 5 and the strap 10 and cable 7 pass between said flanges and downward through a suitable opening formed in the bottom of the bar 5. One of the pulleys 11 is journaled on a suitable pin connecting the upwardly extending ends of a U-shaped member 13 and the adjacent end of the bar 4 removably rests in this member 13, a notch 14 being formed in the bottom of the bar 4 to receive said member. The other pulley 11 is revoluble on a pin connecting the upper ends of links 15 having a pivot pin 16 connecting their lower ends with the bar 4. Coiled tension springs 17 are secured at their upper ends to the lower extremity of the plate 8 and have loops 18 severally connecting their lower ends to the bar 5 so as to normally support said bar in substantially horizontal position.

Where the sling is to be used for the longer bundles of lumber, I prefer to employ two of them and to connect the plates 8 by a rigid bar 19, as best shown in Fig. 2. These slings and load may be suspended from suitable eyes 20, as by a cable 21, connecting the slings with a crane or other power-driven lifting mechanism.

In use, when the sling is not loaded, the bar 5 is suspended in substantially horizontal position by the springs 17 and the weight of the bar 4 is sufficient to hold the cables 7 and strap 10 in extended position so that the bar 4 is at the maximum distance from the bar 5 permitted by the predetermined lengths of the cables and strap. During the loading, the bar 4 may be rested on a suitable support and the boards, bundles or other goods to be carried are piled on the bar or bars 4, as the case may be. When a load of predetermined size has been placed on the bars 4, power may be applied to lift the bars 4 supporting the load. As this is done greatly increased tension is placed on the cables 7 and the strap 10 transmits this tension in the form of a downward pull on the bar 5. This causes the springs 17 to extend until the bar 5 firmly grips the load. Thus it will be seen that the weight of the load is employed in applying gripping force between the bars 4 and 5.

A single sling may be employed for many loads and the present invention is not limited to the provision of a pair of the slings, as shown in Fig. 2.

The springs 17 are designed to permit considerable extension and a corresponding degree of separation of the bars 4 and 5 from the position shown in the drawings. By actual use of the device in a sling designed to carry a bundle of lumber approximately 4 feet square in end view, springs 17 having a pull of about 20 pounds each have been found adequate.

The strap 10 is preferably constructed from heavy webbing or belting with sufficient flexibility to pass readily around the pulleys 11 and rollers 12. Woven steel wires are preferably employed in the construction of the members 7, as these members should be designed to bend laterally as well as around the pulleys 9 when a load is lifted in other than horizontal position.

By my arrangement of the strap 10 connecting the pulleys 11 at opposite ends of the bar 4 movement of the bars 4 and 5 considerably out of parallel relation to each other is permitted while retaining the firm grip on the load. Thus the sling adjusts itself to compensate for irregularities in the form of the load. It will be further understood that my device grips the relatively wide, flat surfaces of the board (not edgeways) and this practically eliminates breakage of the edges by the sling.

Having described my invention what I claim as new and desire to protect by Letters Patent is:

1. A sling comprising, gripping means and supporting means adapted to receive a load between them, flexible suspension members extending between said gripping and supporting means and arranged to support said load, thin and relatively wide bands disposed broadside to the load to engage the same, said bands being operatively connected to said suspension member and connected to said gripping means to draw said gripping means toward the load when the load is suspended on said supporting means and guide pulleys for said bands secured to said supporting means and having axes of rotation extending parallel to the surface of the load to be engaged by said bands.

2. A sling comprising, gripping means and supporting means adapted to receive a load between them, a flexible suspension member extending between said gripping and supporting means and arranged to support said load, an extension of said suspension member arranged to draw said gripping means toward the load when the load is suspended on said supporting means and extensible elements normally supporting said gripping means and adapted to be extended to permit movement of said gripping means into gripping engagement with the load.

3. A sling comprising, upper and lower bars adapted to receive a load between them, flexible suspension members extending between said bars and arranged to support said load and a flexible extension of said suspension members connecting them and engaging said upper bar to draw said upper bar downward when a load is suspended on said lower bar.

4. A sling of the class described comprising, upper and lower bars adapted to receive a load between them, a flexible suspension member extending between said bars and arranged to support said load, an extension of said suspension member arranged to draw said upper bar downward when a load is suspended on said lower bar and extensible means normally supporting said upper bar and adapted to be extended to permit movement of said bar downward into gripping engagement with the load.

5. A sling of the class described comprising, upper and lower bars adapted to receive a load between them, a guide pulley mounted near each end of each of said bars, flexible suspension members extending between said bars and arranged to support opposite sides of a load positioned between said members, said members severally engaging the pulleys on said upper bar, connecting means in continuation of said members, guided by the pulleys on said lower bar and connected to said upper bar to draw said upper bar downward when a load is suspended on said lower bar and means for equalizing the tension in said connecting means.

6. A sling of the class described comprising upper and lower bars adapted to receive a load between them, a guide pulley mounted near each end of each of said bars, flexible suspension members extending between said bars and arranged to support said load, said members severally engaging the pulleys on said upper bar, means in continuation of said members, guided by the pulleys on said lower bar and connected to said upper bar to draw said upper bar downward when a load is suspended on said lower bar, and coiled springs normally supporting said upper bar and adapted to be extended to permit movement of said bar downward into gripping engagement with the load.

7. A sling of the class described comprising, upper and lower bars adapted to receive a load between them, a guide pulley mounted near each end of each of said bars, a roller journaled near each end of said upper bar, flexible suspension members extending between said bars and arranged to support said load, said members severally engaging the pulleys on said upper bar and a flexible connection between said members, guided by the pulleys on said lower bar and by the rollers on said upper bar to draw said upper bar downward when a load is suspended on said lower bar.

In testimony whereof, I have hereunto signed my name to this specification.

HENRY H. PAYZANT